United States Patent
Dewey et al.

(10) Patent No.: US 10,055,149 B2
(45) Date of Patent: Aug. 21, 2018

(54) INTELLIGENT SNAPSHOT TREE REPLICATION

(71) Applicant: SEAGATE TECHNOLOGY LLC, Cupertino, CA (US)

(72) Inventors: Douglas W. Dewey, Longmont, CO (US); Ian R. Davies, Longmont, CO (US); Kenneth F. Day, Tucson, AZ (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 70 days.

(21) Appl. No.: 15/099,434

(22) Filed: Apr. 14, 2016

(65) Prior Publication Data

US 2017/0300247 A1 Oct. 19, 2017

(51) Int. Cl.
*G06F 12/16* (2006.01)
*G06F 3/06* (2006.01)

(52) U.S. Cl.
CPC ............ *G06F 3/0619* (2013.01); *G06F 3/065* (2013.01); *G06F 3/067* (2013.01); *G06F 3/0665* (2013.01)

(58) Field of Classification Search
None
See application file for complete search history.

(56) References Cited

U.S. PATENT DOCUMENTS

| 7,404,051 | B2 | 7/2008 | Shitomi |
| 7,567,991 | B2 | 7/2009 | Armangau et al. |
| 8,332,354 | B1 | 12/2012 | Chatterjee et al. |
| 8,805,786 | B1* | 8/2014 | Natanzon ............ G06F 11/2064 707/639 |
| 9,665,306 | B1 | 5/2017 | Pawardhan |
| 2005/0144407 | A1* | 6/2005 | Colgrove ............ G06F 11/2064 711/162 |
| 2010/0082921 | A1 | 4/2010 | Thompson et al. |
| 2010/0228919 | A1* | 9/2010 | Stabrawa ............ G06F 11/1456 711/120 |
| 2013/0297899 | A1 | 11/2013 | Kawaguchi |
| 2014/0059007 | A1 | 2/2014 | Akirav et al. |
| 2014/0081911 | A1* | 3/2014 | Deshpande ......... G06F 11/1448 707/610 |
| 2015/0066857 | A1 | 3/2015 | Dayal et al. |
| 2015/0127661 | A1 | 5/2015 | Zamir et al. |
| 2015/0127768 | A1 | 5/2015 | Zamir et al. |
| 2015/0370502 | A1* | 12/2015 | Aron ..................... G06F 3/0626 711/162 |
| 2016/0117163 | A1* | 4/2016 | Fukui ....................... G06F 8/65 717/171 |

(Continued)

*Primary Examiner* — Ryan Bertram
*Assistant Examiner* — Trang K Ta
(74) *Attorney, Agent, or Firm* — Holland & Hart LLP

(57) ABSTRACT

Systems and methods for intelligent replication of a snapshot tree are described. In one embodiment, a first storage system may include a storage controller. In some embodiments, the storage controller may be operable to replicate a first storage volume of a first storage system and a first user snapshot of the first storage volume to a second storage volume of a second storage system and capture a first tree structure block (TSB) of the first storage system. In some cases, the first user snapshot may include a point in time capture of data on the first storage volume at a first time. In some embodiments, the first TSB captures a hierarchy of each snapshot of the first storage system.

17 Claims, 9 Drawing Sheets

(56) References Cited

U.S. PATENT DOCUMENTS

2016/0170823 A1    6/2016  Miller et al.
2016/0335278 A1*  11/2016  Tabaaloute ........ G06F 17/30088
2017/0206016 A1*  7/2017  Sun ........................ G06F 3/065
2017/0249222 A1    8/2017  Patnaik et al.

\* cited by examiner

INTELLIGENT SNAPSHOT TREE REPLICATION

SUMMARY

According to at least one embodiment, a first storage system for intelligent replication of a snapshot tree is described. In one embodiment, the first storage system may include a storage controller. In some embodiments, the storage controller may be operable to replicate a first storage volume of a first storage system and a first user snapshot of the first storage volume to a second storage volume of a second storage system and capture a first tree structure block (TSB) of the first storage system. In some cases, the first user snapshot may include a point in time capture of data on the first storage volume at a first time. In some embodiments, the first TSB captures a hierarchy of each snapshot of the first storage system.

In some embodiments, the storage controller may be operable to create first and second system snapshots of the first TSB and copy the first TSB into at least one of first and second system snapshots of the first TSB. In some cases, the user snapshots may be initiated by a user of the storage system while system snapshots may be initiated by the storage system. In some embodiments, the storage controller may be operable to create a second user snapshot of the first storage volume. In some cases, the second user snapshot may include a point in time capture of data on both the first storage volume and the first user snapshot at a second time after the first time.

In some embodiments, the storage controller may be operable to capture a second TSB of the first storage system after creating the second user snapshot. In some embodiments, the storage controller may be operable to create first and second system snapshots of the second user snapshot and copy a first system snapshot of the first user snapshot to at least one of the first and second system snapshots of the second user snapshot.

In some embodiments, after capturing the second TSB, the storage controller may be operable to capture a point in time snapshot of the first user snapshot. In some embodiments, the storage controller may be operable to update the first system snapshot of the first user snapshot with the point in time snapshot of the first user snapshot and compare the updated first system snapshot of the first user snapshot to the second system snapshot of the first user snapshot.

In some embodiments, the storage controller may be operable to identify, based on the comparing, a difference in data between the first and second system snapshots of the first user snapshot and update a replica of the first system snapshot of the first user snapshot on the second storage volume based on the identified difference.

In some embodiments, the storage controller may be operable to compare the first TSB to the second TSB. Based on comparing the first TSB to the second TSB, the storage controller may be operable to identify the second user snapshot as a new user snapshot since capturing the first TSB and mount the second user snapshot as a volume viewable to a user of the first storage system.

In some embodiments, the storage controller may be operable to replicate, to the second storage system, the second user snapshot and the first and second system snapshots of the second user snapshot. In some embodiments, the storage controller may be operable to receive a command to delete the first user snapshot of the first storage volume and capture a third TSB of the first storage system after capturing the second TSB.

In some embodiments, the storage controller may be operable to identify the command to delete the first user snapshot based on comparing the second TSB to the third TSB and delete the first user snapshot of the first storage volume and the first and second system snapshots of the first user snapshot based on identifying the command to delete the first user snapshot. In some embodiments, the storage controller may be operable to identify a new user snapshot on the second storage volume based on a replica of the third TSB copied to the second storage system and create a hidden volume on the second storage volume.

In some embodiments, the storage controller may be operable to mount the new user snapshot of the second storage volume on the hidden volume, create first and second system snapshots of the hidden volume, and copy the hidden volume to at least one of the first and second system snapshots of the hidden volume.

An apparatus configured for intelligent replication of a snapshot tree is also described. The apparatus may include a storage drive configured for incorporation into a data center or private cloud environment and a storage controller. The storage controller may be operable to replicate a first storage volume of a first storage system and a first user snapshot of the first storage volume to a second storage volume of a second storage system and capture a first tree structure block (TSB) of the first storage system. In some cases, the first user snapshot may include a point in time capture of data on the first storage volume at a first time. In some embodiments, the first TSB captures a hierarchy of each snapshot of the first storage system.

A computer-implemented method for intelligent replication of a snapshot tree is described. In one embodiment, the method may include replicating a first storage volume of a first storage system and a first user snapshot of the first storage volume to a second storage volume of a second storage system and capturing a first tree structure block (TSB) of the first storage system. In some cases, the first user snapshot may include a point in time capture of data on the first storage volume at a first time. In some embodiments, the first TSB captures a hierarchy of each snapshot of the first storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
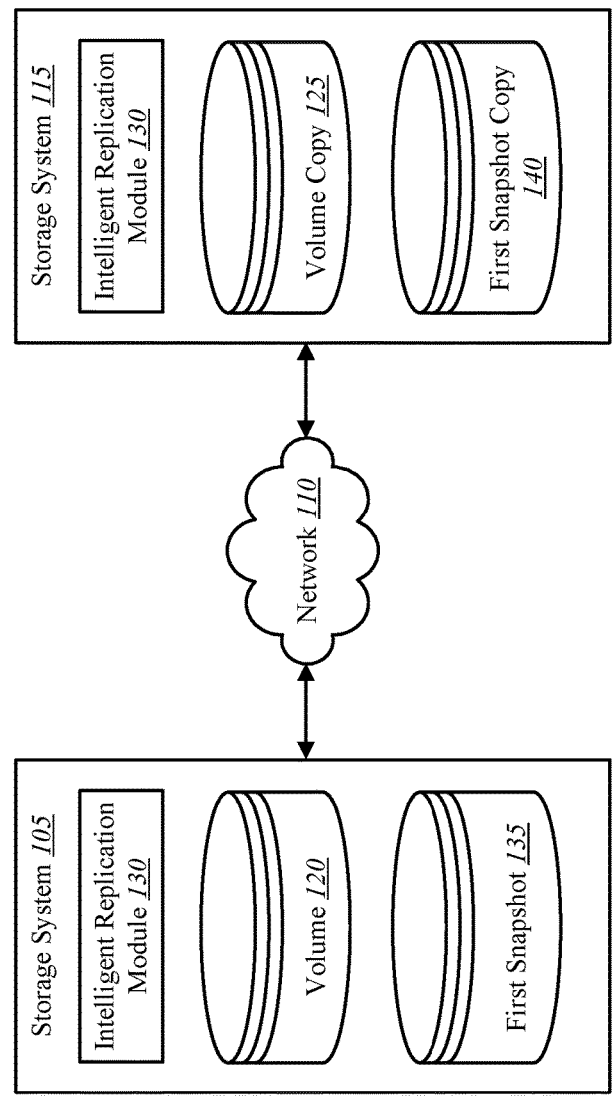
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to intelligent replication of a snapshot tree. More specifically, the systems and methods described herein relate to intelligent replication of a snapshot tree in relation to a distributed data system such as a cloud storage system as one example. Cloud services are popular because they make it convenient to share documents between different users or for the same user across any machine with Internet access.

The present systems and methods include operations to replicate a primary volume to a secondary volume. Models of replication may include (a) enabling a user to specify the replication of a volume such as done with Asynchronous Replication (AR); and (b) replicating only snapshots of the volume such as done with Remote Snapshot Replication (RSR). In one embodiment, for both a primary and secondary storage system, internal system snapshots of the respective base volume of each system may be created. For example, first and second system snapshots (S1 and S2) may be created of the base volume on the primary system, and first and second system snapshots (S1 and S2) may be created of the base volume on the secondary system. After the creation of the replication set, the primary and secondary base volumes and the respective S1 and S2 either contain or point to the same data.

Between the time that the replication set is created and the initial replication occurs, it is possible that hosts have written additional data to the primary volume. In one embodiment, during initial replication, the user may initiate replication on the primary system. On both the primary and secondary systems, the S1 data of the respective system replaces the S2 contents on the same respective system. For example, data from S1 of the primary system replaces the data on S2 of the primary system, etc. The current primary volume data, which might be different from when the replication set was created, replaces the contents of S1 on the primary system. The S1 data, which matches that of the primary volume, is replicated in its entirety to its S1 counterpart on the secondary system and replaces the data that this S1 contains. The S1 data on the secondary system replaces the data that the secondary volume contains. The contents of the primary and secondary volumes are then synchronized.

During the initial replication, the entire contents of the primary volume may be replicated to the secondary volume. In subsequent replications, only data that is new or modified since the last replication operation may be replicated. In one embodiment, a snapshot of the primary volume data from the last replication may be compared with a current snapshot of the primary volume. In one embodiment, the user initiates replication on the primary system. On each respective primary and secondary system, the S1 data of one system replaces the S2 contents of the same system. Next, the current primary volume data replaces the contents of Si on the primary system. The S1 data on the primary system, which now matches that of the primary volume, may be compared to the S2 data on the primary system. Only the data that is the delta between S1 and S2 is replicated to its S1 counterpart on the secondary system, which is updated with the delta data. The S1 data on the secondary system then replaces the data that the secondary volume contains. The contents of the primary and secondary volumes are then synchronized.

Given a storage system, replication may include replicating either a volume or a volume group to another storage system. A user of the storage system may manage a base volume as well as arbitrary, user-defined snapshots, which may include parent snapshots (e.g., snapshot of a base volume) as well as child snapshots (e.g., snapshots of a parent snapshot).

The hierarchy of parent and child snapshots may be referred to as a snapshot tree or snap tree. It is noted that in some cases a snapshot may be referred to as a snap. It is desirable to be able to replicate on a remote storage system an exact copy of the primary storage system in not just individual volume contents, but also in the relationships of and between those volumes (e.g., snap hierarchy, etc.). However, problems exist in implementing such a system with current replication approaches. Current replication systems are based on managing a single volume or a volume group. Using current replication interfaces, it is burdensome, if not impossible, to automate or script a system that replicates the relationships between and of the volumes.

With current replication systems, creating a new snap on the primary typically causes the entire set of the data in the new snap to be copied to the remote storage system, consuming computing resources and system communication bandwidth. Also, the full copy of the new snap would result in pages not being shared on the remote storage system between the new snap and the parent of the snap that are shared on the primary storage system. In some embodiments, a child snapshot on the primary storage system may share one or more pages or page data sets with a parent snapshot on the primary storage system. For example, a child snapshot may point to a page of the parent snapshot so that only one actual copy of the page exists. Accordingly, a full copy of the new snap will remove this relationship if the new snap is a child snap that points to one or more pages of a parent snap on the primary storage system.

Prior methods have included systems with no concept of a snap tree, and even if a system includes the concept of a snap tree, such systems are still based on volumes and a simple grouping of volumes with no internal relationships maintained between the volumes of the group and no intelligent usage of the relationships between volumes in the group. The present systems and methods avoid these problems by introducing system intelligence of the snap tree structure. The systems and methods disclosed herein extend the current AR algorithm used for volumes and volume groups to the entire tree by (a) adding tracking of the hierarchical relationships of the individual volumes and/or snapshots and implementing the tracked relationships remotely; and (b) using a parent volume's last replicated image as a starting image for a snapshot on the initial replication of that snapshot.

A potential work around to the disclosed systems and methods could include defining all the snaps of a tree as a volume group and replicating them as a group and sending over the hierarchical information of the volume relationships and storing it remote. However, such a system would not have all the functions of the present systems and methods as it would not actually recreate the volumes as snaps of each other, but would keep them as a simple group. Also, such a system would involve some of the function of the present systems and methods, but would fail to implement the hierarchy when a snap is dynamically created and/or deleted. Dynamically created and deleted snapshots, respectively, would not automatically appear on or automatically be removed from on the remote system. A user would have to manage creation and configuration of separate replication services on the snaps manually. Such a system would also fail to have the performance advantage of a system that knows a snap's data is the same as its parents at the initial replication.

Current replication features of a storage array provide replication of either a volume or a volume group, which is a user defined grouping of volumes that is then replicated at the same time. The members of a volume group may or may not have any other relationships between the volumes. With the current systems and methods, storage arrays that a user creates and manages are part of a snap tree, which may include a base volume created by a user and then any snaps of the volume and snaps of those snaps, etc. The snaps may be created by user commands and/or created by the system based on a schedule.

In one embodiment, with the present systems and methods a user may specify that a snap tree is to be replicated as an entity. In one embodiment, snaps that are created and deleted on a primary storage system are automatically shadowed on the remote. A crash consistent image of all the data of each snap and the base volume in the snap tree are replicated with consistency semantics to the remote storage system. In one embodiment, only changed data is copied to the remote storage system on each replication sync job. In some embodiments, a user may schedule replication of the entire tree, which includes data images in the tree at a point in time, not just the data image of a volume or volume group, providing an increase in ease of use with an improved replication model.

The present systems and methods may be implemented with a single command versus conventional systems requiring a user to define and manage separate replications for each snap. An advantage of the present systems and methods is that the snap tree matches how a user uses the data and backs it up over time on the primary storage system with a backup on a remote storage system that matches the snap tree, enabling quicker failure management to the remote site compared to conventional systems as well as providing a simpler management model to less skilled system managers.

In one embodiment, a replication may be referred to as a Tree Sync Job. In some embodiments, a Tree Sync Job may be scheduled by a storage system. Additionally, or alternatively, a Tree Sync Job may be run in relation to a snap being created, a snap being deleted, and/or a snap being updated or reset. In one embodiment, the present systems and methods may include using an extension of a current AR sync job to perform operations on a snap tree.

In one embodiment, the snap tree structure and volume names may be stored in a data block, or tree structure block (TSB), and managed and updated using system snapshots of the TSB. For example, a first system snapshot of the TSB may include a current replicated copy of the TSB and a second system snapshot of the TSB may include a previous replicated copy of the TSB, enabling the system to determine what snapshots have been created and/or deleted between replications, if any. Thus, two system-managed snapshots (S1 and S2) may be created for the base volume of the primary storage system, for each snapshot that is created in the snapshot tree since the last Tree Sync Job ran, and for the TSB. In one embodiment, when a snapshot is deleted, the system snapshots of this snapshot are deleted as well.

In one embodiment, the system may scan the snapshot tree. Based on the scan, TSB.NewCurrent may be created. System snapshots, TSB.S1 and TSB.S2, of TSB.NewCurrent may be created if they do not already exist. In some embodiments, the system may compare TSB.NewCurrent to TSB.S1. In some cases, the system may compare TSB.NewCurrent to TSB.S2 when a last sync job is cancelled and/or unsuccessful.

In some embodiments, a Tree Sync Job may include recording a new TSB to capture the current states of the snapshot tree. The new TSB may be copied from the primary storage system to a remote storage system. On the primary side, if the system determines a new snapshot has been created since the last replication, the system may create the system snapshots S1 and S2 of the new snapshot. On the remote side, if the system detects a new snap the system may create a hidden volume for the new snapshot and create the system snapshots S1 and S2 of the new snapshot.

In one embodiment, the primary storage system may take internal system snapshots of the data images of all the volumes and/or snapshots currently in the snapshot tree and copy the captured system snapshots to the respective S1s of each volume and/or snapshot. For those volumes and/or snapshots viewable to a user, the system may copy the data copied to each respective system snapshot S1 to the respective user viewable volumes.

In some embodiments, the system may copy the entire contents of a new snapshot created since the last sync job that has not already been replicated to the remote storage system. In some embodiments, the system may copy to a remote storage system the entire contents of a new snapshot that is not associated with a parent snapshot. In some embodiments, the system may copy only the data that has changed since the last replication for each snapshot that existed at the last sync job. Once all data marked for replication has been replicated to the remote storage system, the system may compare a TSB.Current to a TSB.Previous, which may include TSB.S1 and/or TSB.S2. In some embodiments, the system may identify a new snap based on the comparison of TSB.Current to TSB.Previous. In some cases, the system may provide a new snapshot as a volume viewable to a user. In one embodiment, the system may delete each snap marked by the user for deletion.

In some embodiments, the present systems and methods may extend an asynchronous replication system to a snapshot tree by adding steps such as determining and saving a snapshot tree structure of a primary storage system with a TSB and applying the tree structure changes at a remote storage system. In one embodiment, upon detecting a new snapshot on the primary storage system the present systems and methods may identify a parent snapshot of the new snapshot and copy the parent's last replicated image (i.e., the S1 of the parent snapshot) into the S1 and S2 of the new snapshot. In some cases, the present systems and methods may add to the S1 and S2 of the new snapshot at least one pointer to the data in the S1 of the parent snapshot instead of copying that data to the S1 and S2 of the new snapshot.

In one embodiment, upon detecting a new snapshot on the remote storage system, the present systems and methods may identify a parent snapshot of the new snapshot and move the parent's last replicated image into the S1 and S2 of the new snapshot. In some cases, the system may perform a delta sync job on the new snapshot, comparing the contents of the new snapshot to at least one of the S1 and S2 of the new snapshot to detect changed data in the new snapshot compared to the parent snapshot. Accordingly, the system may copy only the detected changed data to the remote storage system.

In one embodiment, the primary storage system may generate a new TSB to capture the snapshot tree shape and copy the new TSB to the remote storage system. Upon detecting a new snap on the primary storage system, based at least in part on analysis of the new TSB, the primary system may create the S1 and S2 of the new snap, identify a parent snap of the new snap, and move to S1 and S2 the contents of the parent's last replicated image in the S1 and/or S2 of the parent snap.

In one embodiment, upon detecting a new snap on the remote storage system, the system may create a hidden volume on the remote storage system for the new snap, create the S1 and S2 of the hidden volume, and move to both S1 and S2 of the new snap the contents of the parent snap's last replicated image in the S1 and/or S2 of the parent snap. In one embodiment, the primary system may take internal snaps of the data images of all the volumes and/or snapshots in the snapshot tree and copy these captured snapshots to the respective S1s of each volume and/or snapshot. The system may determine whether data has been modified on any of the volumes and/or snapshots since the last replication and copy only the modified data to the remote storage system. Once all data marked for replication is moved to the remote storage system, the system may analyze the current TSB (e.g., TSB.Current) in relation to the previous TSB (e.g., TSB.S1 and/or TSB.S2) and make the newly created snap volumes viewable and delete any snaps that are marked for deletion.

FIG. 1 is a block diagram illustrating one embodiment of an environment 100 in which the present systems and methods may be implemented. In some embodiments, the systems and methods described herein may be performed on a client and/or server device. The environment 100 may include storage system 105, network 110, and storage system 115. In some embodiments, environment 100 may depict a user view of storage system 105 and/or 115. Thus, a user may view and access both a storage volume 120 and a first snapshot 135 of storage system 105 and/or both a storage volume copy 125 and a first snapshot copy 140 of storage system 115.

Examples of the storage systems 105 and/or 115 include mobile devices, smart phones, personal computing devices, computers, laptops, desktops, servers, a set top box providing access to media content, gaming consoles, home automation systems, data storage systems, data enclosures, and generally any computing device able to store data and/or transmit data over a data communication network. Examples of storage systems 105 and/or 115 may include a cloud server, a data server, a corporate server, and/or a home automation server, etc.

In some configurations, storage system 105 may include an intelligent replication module 130, a storage volume 120, and a first snapshot 135. Intelligent replication module 130 may be configured to replicate data on storage system 105 to storage system 115. In some embodiments, first snapshot 135 includes a point in time copy of data on storage volume 120. Thus, first snapshot 135 may include at least a portion of the data, applications, settings, etc., on storage volume 120 at a particular point in time. In some embodiments, first snapshot 135 may be captured as a result of a user initiating a snapshot of storage volume 120. In some configurations, first snapshot 135 is viewable and accessible to a user. In some embodiments, first snapshot 135 may be readable/writable/modifiable by a user. In some cases, first snapshot 135 may be referred to as a user snapshot because first snapshot 135 is initiated by a user and/or because first snapshot 135 is accessible/modifiable by a user.

In some configurations, storage system 115 may include intelligent replication module 130, a storage volume copy 125, and a first snapshot copy 140. In some cases, storage volume copy 125 may include a replicated copy of storage volume 120 of storage system 105. Additionally, first snapshot copy 140 may include a replicated copy of first snapshot 135 of storage system 105. In some embodiments, storage volume copy 125 may be configured as a read-only storage volume. In some configurations, first snapshot copy 140 may be mounted as a volume on storage system 115 and configured as accessible/modifiable by a user. In some cases, first snapshot copy 140 may be readable and writable by a user. In some embodiments, first snapshot copy 140 may be referred to as a user snapshot because first snapshot copy 140 is initiated by a user and/or because first snapshot 135 is viewable/accessible by a user.

In some embodiments, intelligent replication module 130 may be configured to replicate data between storage system 105 and storage system 115. In some embodiments, storage systems 105/115 may include one or more software applications and/or web-based applications (e.g., any combination of JavaScript, hypertext markup language (HTML), and cascading style sheets (CSS)), configured in conjunction with intelligent replication module 130 to enable certain operations described herein.

In some embodiments, storage system 105 may communicate with storage system 115 via network 110. Examples of network 110 may include cloud networks, local area networks (LAN), wide area networks (WAN), virtual private networks (VPN), wireless networks (using 802.11, for example), cellular networks (using 3G and/or LTE, for example), etc. In some configurations, the network 110 may include the Internet.

In some cases, storage system 105 and/or storage system 115 may each include an intelligent replication module where at least a portion of the functions of intelligent replication module 130 are performed separately and/or concurrently on storage system 105 and/or storage system 115. Intelligent replication module 130 may be configured to replicate data stored on storage system 105 to storage system 115 and/or replicate data stored on storage system 115 to storage system 105. Further details regarding the intelligent replication module 130 are discussed below.

Figure 2:
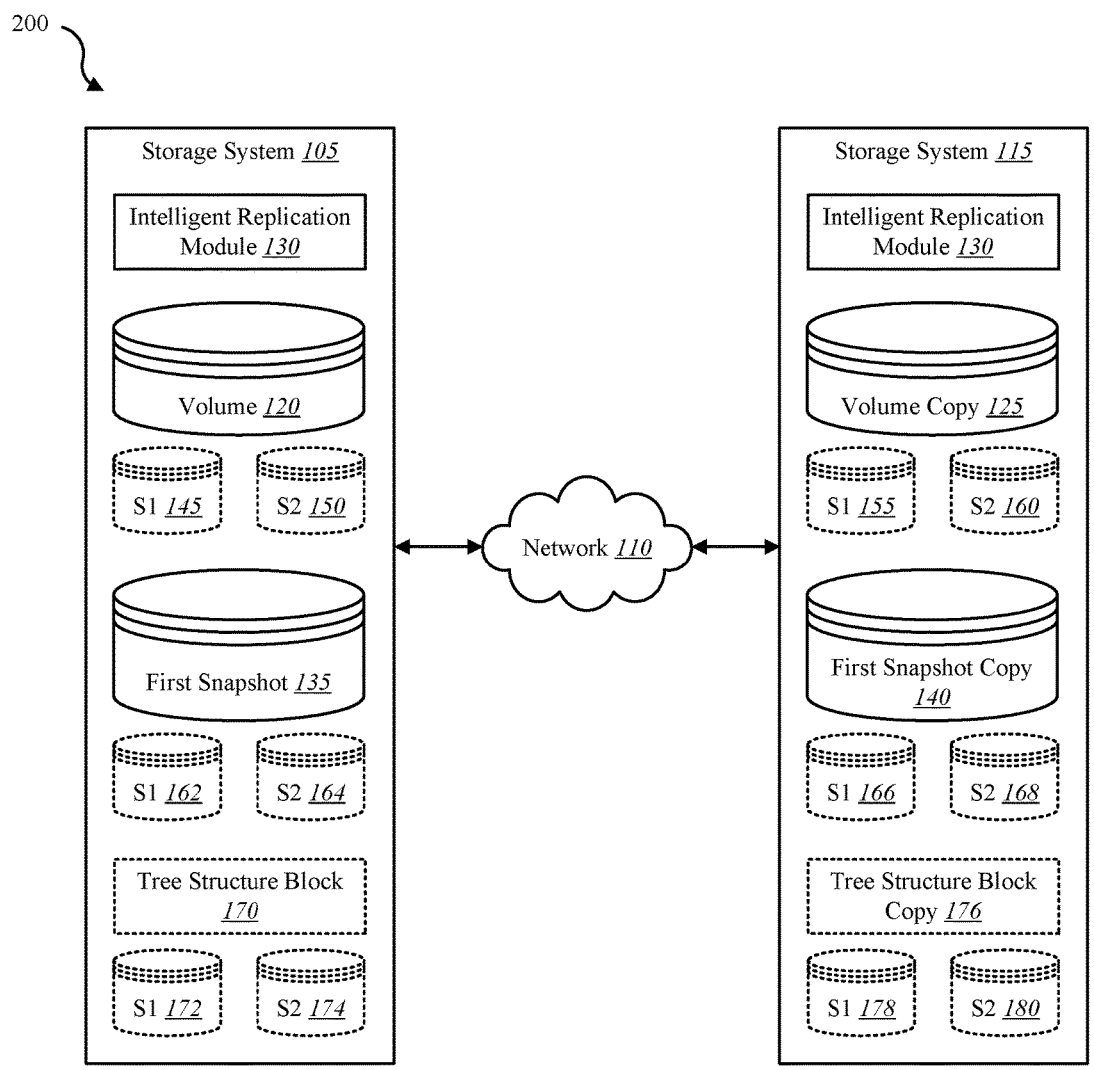
FIG. 2 is a block diagram illustrating one embodiment of an environment in which the present systems and methods may be implemented.

FIG. 2 is a block diagram illustrating one embodiment of an environment 200 in which the present systems and methods may be implemented. In some embodiments, the systems and methods described herein may be performed on one or more client and/or server devices. In some embodiments, environment 200 may be an example of environment 100 of FIG. 1. Thus, environment 200 may include storage system 105, network 110, and storage system 115.

In some embodiments, environment 200 may depict a system view of storage system 105 and/or 115. Thus, in addition to storage volume 120 and first snapshot 135 of storage system 105 being accessible to storage system 105, storage system 105's view may also include system accessibility/modifiability of at least first and second system snapshots 145 and 150 of storage volume 120, first and second system snapshots 162 and 164 of first snapshot 135, and first and second system snapshots 172 and 174 of tree structure block 170. In some cases, intelligent replication module 130 may create tree structure block copy 176 and copy the contents of tree structure block 170 to tree structure block copy 176 on storage system 115.

Intelligent replication module 130 may create first and second system snapshots 178 and 180 of tree structure block copy 176 and copy the contents of tree structure block copy 176 to at least one of first and second system snapshots 178 and 180. It is noted that a first system snapshot may be referred to as "S1," while a second system snapshot may be referred to as "S2," as illustrated in FIG. 2. In some embodiments, intelligent replication module 130 may create first and second system snapshots 172 and 174 of tree structure block 170 upon creating tree structure block 170 to store the captured current state of the snapshot tree hierarchy of storage system 105.

Like a user snapshot, a system snapshot may also include copies of data at a particular point in time, but instead of being initiated and accessible by a user, system snapshots may be initiated and managed by the storage system (e.g., storage system 105) and configured to be hidden or inaccessible to a user of the storage system. Thus, in some embodiments, like first snapshot 135, system snapshots 145 and 150 may include copies of data at particular points in time, but instead of being initiated and viewable by a user, system snapshots 145 and 150 may be initiated and managed by a system (e.g., storage system 105) and configured to be inaccessible to a user.

Likewise, first and second system snapshots 155 and 160 of storage volume copy 125, first and second system snapshots 166 and 168 of first snapshot copy 140, and first and second system snapshots 178 and 180 of tree structure block copy 176 of storage system 115 may be initiated by a system (e.g., storage system 105 and/or 115), accessible/modifiable by the system, and inaccessible to a user.

In some embodiments, intelligent replication module 130 may initiate and control system snapshots such as system snapshots 145/150, 155/160, 162/164, 166/168, 172/174, and/or 178/180. In one embodiment, storage volume 120 may be created and mounted on storage system 105. Upon creating storage volume 120, intelligent replication module 130 may create first system snapshot 145 and second system snapshot 150. Data written to storage volume 120 may be replicated to at least one of system snapshots 145 and 150. In some cases, the data may be replicated to a system snapshot as the data is written to storage volume 120.

In some configurations, intelligent replication module 130 may replicate storage volume 120 to storage system 115. The copy of storage volume 120 may be stored as storage volume copy 125 on storage system 115. Intelligent replication module 130 may create first system snapshot 155 of storage volume copy 125 and second system snapshot 160 of storage volume copy 125 on storage system 115. In some cases, intelligent replication module 130 may copy content from storage volume copy 125 to at least one of system snapshot copies 155 and 160.

As one example, a user of storage system 105 may create first snapshot 135 (i.e., a user snapshot initiated and configured to be accessible/modifiable by the user). Upon initiating first snapshot 135, intelligent replication module 130 may capture a point in time copy of data on storage volume 120. Intelligent replication module 130 may use this point in time copy of storage volume 120 to create first snapshot 135. Thus, first snapshot 135 may contain a point in time copy of storage volume 120.

Upon copying the point in time copy of storage volume 120 into first snapshot 135, intelligent replication module 130 may copy content in first system snapshot 145 of storage volume 120 into second system snapshot 150 of storage volume 120. Intelligent replication module 130 may then copy content in first snapshot 135 to first system snapshot 145 of storage volume 120. In some cases, intelligent replication module 130 may then copy content in first system snapshot 155 of storage volume copy 125 to second system snapshot 160 of storage volume copy 125.

In some embodiments, intelligent replication module 130 may copy content from first system snapshot 145 of storage volume 120, updated with content from first snapshot 135, to first system snapshot 155 of storage volume 120. In some embodiments, intelligent replication module 130 may identify a delta of data between (a) data on first system snapshot 145 before content from first snapshot 135 is copied to first system snapshot 145 and (b) data on first system snapshot 145 after content from first snapshot 135 is copied to first system snapshot 145.

In some cases, intelligent replication module 130 may copy only the identified delta or change in data from the first system snapshot 145 of storage volume 120 to the first system snapshot 155 of storage volume copy 125 on storage system 115, thus conserving bandwidth and system resources and minimizing the time a data transfer takes. In some embodiments, intelligent replication module 130 may make first snapshot 135 on storage system 105 and/or first snapshot copy 140 on storage system 115 accessible/modifiable to a user.

In some embodiments, intelligent replication module 130 may use a parent volume's last replicated image as a starting image for a new snapshot on the initial replication of that new snapshot. Thus, as one example, upon identifying first snapshot 135 as a new snapshot on storage system 105, intelligent replication module 130 may use the last replicated image of storage volume 120 (e.g., an image in first system snapshot 145 and/or second system snapshot 150 of storage volume 120) as a starting image for first snapshot 135 on the initial replication of first snapshot 135.

In one embodiment, intelligent replication module 130 may capture a current state of a snapshot tree hierarchy or the hierarchy of each snapshot and/or volume of the storage system 105. The snapshot tree hierarchy may include a map of the interconnected volumes/snapshots on storage system 105 and the relationships between each volume and/or snapshot, such as whether a snapshot is a snapshot of a base volume such as storage volume 120, or whether a snapshot is a current snapshot of a previous snapshot (e.g., a child snapshot of a parent snapshot). In some cases, intelligent replication module 130 may track the hierarchical relationships of the individual volumes and/or snapshots of storage system 105 and implement the tracked relationships remotely on storage system 115.

In some embodiments, the captured current state of the snapshot tree hierarchy may be stored in a block of data having a sequence of bytes or bits containing some whole number of records, having a maximum length or block size.

Thus, in one embodiment, the captured current state of the snapshot tree hierarchy may be captured in tree structure block 170. In some embodiments, the captured snapshot tree hierarchy may include the interconnections between each volume/snapshot of storage system 105 and an identifier or name for each volume/snapshot. Upon capturing the structure of the snapshot tree hierarchy, intelligent replication module 130 may create first and second system snapshots 172/174 of tree structure block 170. Further details regarding the intelligent replication module 130 are discussed below.

Figure 3:
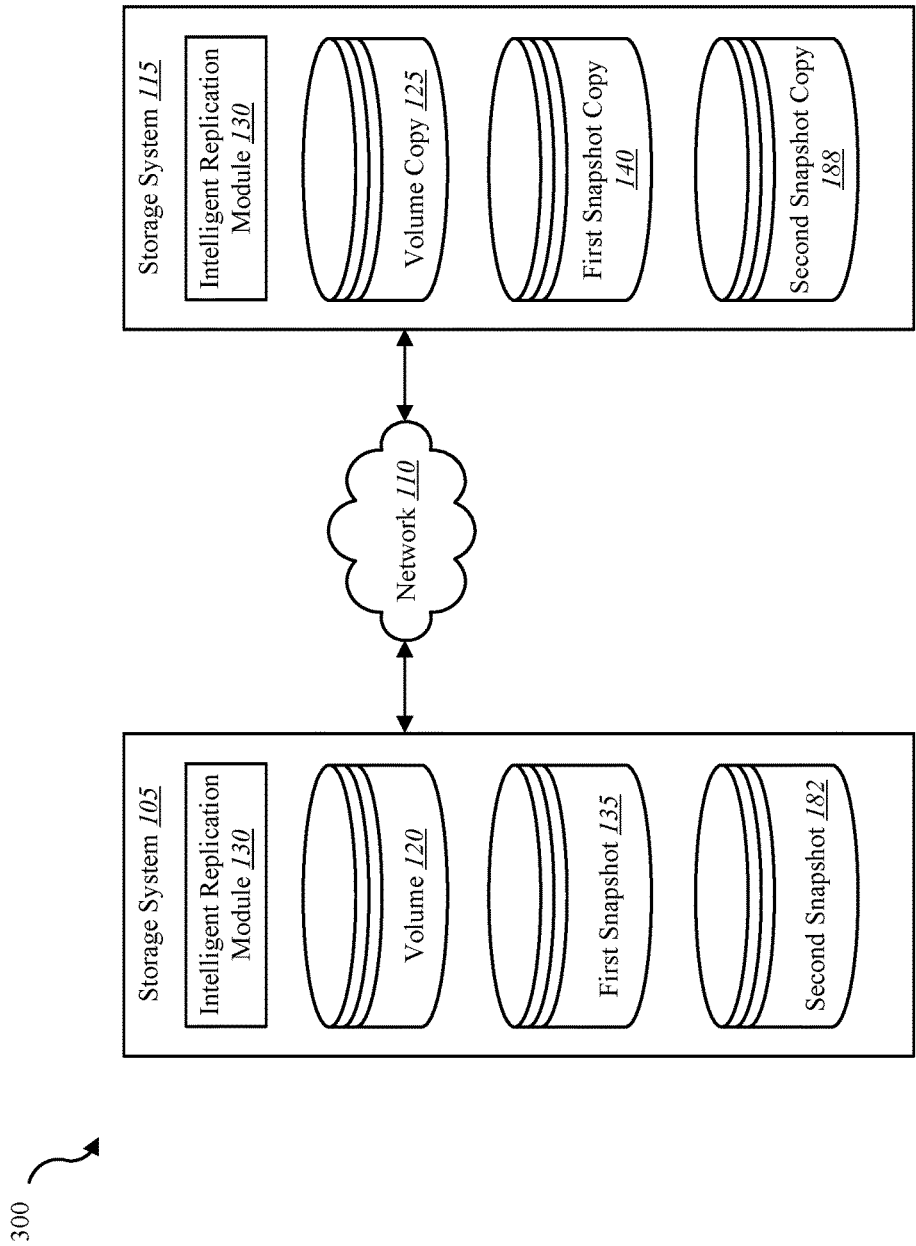
FIG. 3 is a block diagram illustrating one embodiment of an environment in which the present systems and methods may be implemented.

FIG. 3 is a block diagram illustrating one embodiment of an environment 300 in which the present systems and methods may be implemented. In some embodiments, the systems and methods described herein may be performed on a client and/or server device. In some embodiments, environment 300 may be an example of environment 100 of FIG. 1 and/or environment 200 of FIG. 2. Thus, environment 300 may include storage system 105, network 110, and storage system 115.

As depicted, a new snapshot, second snapshot 182, may be created on storage system 105. In some cases, a user of storage system 105 may initiate creation of second snapshot 182. Thus, second snapshot 182 may be a user snapshot that is accessible/modifiable by a user of storage system 105. In some embodiments, intelligent replication module 130 may replicate second snapshot 182 to storage system 115. Thus, intelligent replication module 130 may replicate second snapshot 182 as second snapshot copy 140 on storage system 115. In some embodiments, environment 300 may depict a user view of storage system 105 and/or 115. Thus, a user may access and/or modify both storage volume 120, first snapshot 135, and second snapshot 182 of storage system 105 and/or storage volume copy 125, first snapshot copy 140, and second snapshot copy 188 of storage system 115. In some embodiments, intelligent replication module 130 may mount first snapshot copy 140 and/or second snapshot copy 188 as user-accessible volumes on storage system 115.

Figure 4:
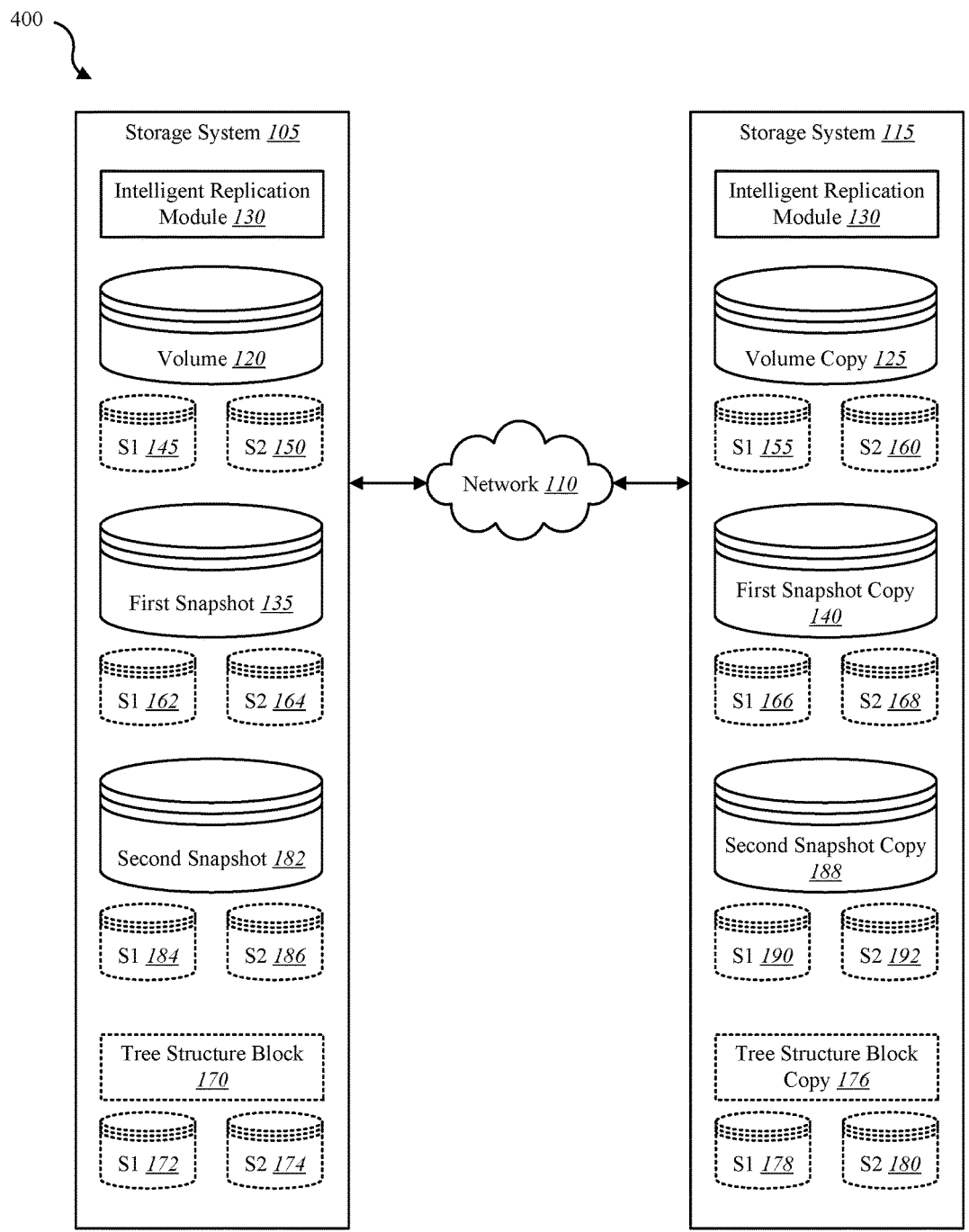
FIG. 4 is a block diagram illustrating one embodiment of an environment in which the present systems and methods may be implemented.

FIG. 4 is a block diagram illustrating one embodiment of an environment 400 in which the present systems and methods may be implemented. In some embodiments, the systems and methods described herein may be performed on a client and/or server device. In some embodiments, environment 400 may be an example of environment 100 of FIG. 1, environment 200 of FIG. 2, and/or environment 300 of FIG. 3. Thus, environment 400 may include storage system 105, network 110, and storage system 115.

In some embodiments, environment 400 may depict a system view of storage system 105 and/or 115. Thus, in addition to storage volume 120, first snapshot 135, and second snapshot 182 being viewable to storage system 105, this system view may also include at least first and second system snapshots 145 and 150 of storage volume 120, first and second system snapshots 162 and 164 of first snapshot 135, first and second system snapshots 184 and 186 of second snapshot 182, and first and second system snapshots 172 and 174 of tree structure block 170 being accessible/modifiable by storage system 105.

Likewise, first and second system snapshots 155 and 160 of storage volume copy 125, first and second system snapshots 166 and 168 of first snapshot copy 140, first and second system snapshots 190 and 192 of second snapshot copy 188, and first and second system snapshots 178 and 180 of tree structure block copy 176 of storage system 115 may be initiated by a system (e.g., storage system 105 and/or 115), accessible/modifiable by the system, and inaccessible to a user.

In one embodiment, intelligent replication module 130 may capture a current state of the snapshot tree hierarchy of storage system 105 after second snapshot 182 is created. In some cases, the captured current state of the snapshot tree hierarchy may be captured in tree structure block 170. In some embodiments, intelligent replication module 130 may analyze the captured current state of the snapshot tree hierarchy stored in tree structure block 170. Based on this analysis, intelligent replication module 130 may identify second snapshot 182 as a new snapshot added to storage system 105 since the last replication sync job.

Upon identifying second snapshot 182 as a new snapshot on storage system 105, intelligent replication module 130 may use the last replicated image of first snapshot 135 (e.g., an image in first system snapshot 162 and/or second system snapshot 164 of first snapshot 135) as a starting image for second snapshot 182 on the initial replication of second snapshot 182. Thus, intelligent replication module 130 may create first and second system snapshots 184 and 186 upon identifying second snapshot 182 as a new snapshot on storage system 105.

In some cases, system snapshots may point to data in a user snapshot or volume instead of containing a copy of that data. For example, a copy of a file in storage volume 120 may be copied to first snapshot 135. In some cases, instead of making a third copy of this file in the first system snapshot 162 of first snapshot 135, intelligent replication module 130 may point to the actual file in storage volume 120 and/or the copy of the file in first snapshot 135.

In some embodiments, intelligent replication module 130 may copy the entire contents of second snapshot 182 to storage system 115. In some embodiments, intelligent replication module 130 may create second snapshot copy 188 to store the contents of second snapshot 182 copied to storage system 115. In some cases, upon identifying second snapshot 182 as a new snapshot on storage system 105, intelligent replication module 130 may use the last replicated image of first snapshot copy 140 (e.g., an image in first system snapshot 166 and/or second system snapshot 168 of first snapshot copy 140) as a starting image for second snapshot copy 188 on the initial replication of second snapshot 182 to storage system 115.

In some cases, intelligent replication module 130 may capture a point in time view of each snapshot/volume of storage system 105 after identifying second snapshot 182 as a new snapshot. Each captured point in time view may include the data and metadata of each associated snapshot/volume of storage system 105. Based on the captured point in time views, intelligent replication module 130 may compare the current captured point in time views to the last known captured point in time views for each respective snapshot/volume to determine whether data has been updated or modified on a respective snapshot/volume. These identified data changes may include new data added to a snapshot/volume since the last replication, data existing at the last replication that is modified since the last replication, and data deleted since the last replication.

In some embodiments, intelligent replication module 130 may send only these identified data changes of the snapshots/volumes of storage system 105 to the copies of these snapshots/volumes replicated to storage system 115. Thus, in some embodiments, intelligent replication module 130 may build second snapshot copy 188 from the last replicated image of first snapshot copy 140 and identified changes.

For example, intelligent replication module 130 may transfer to the storage system 115 the associated data changes since the last replication identified as indicated above. For instance, intelligent replication module 130 may compare second snapshot 182 to first snapshot 135. Based on this comparison, intelligent replication module 130 may identify identical data found in both second snapshot 182 and first snapshot 135, new data only found in second snapshot 182 and not first snapshot 135, and deleted data found in second snapshot 182 and not first snapshot 135.

Intelligent replication module 130 may send these identified data changes to storage system 115. Based on these identified data changes, received by storage system 115, the intelligent replication module 130 may add to the second snapshot copy 188 the relative data changes to complete second snapshot copy 188 as a full copy of second snapshot 182. Thus, second snapshot copy 188 may be built by adding the last replicated image of first snapshot copy 140 with the identified data changes.

Figure 5:
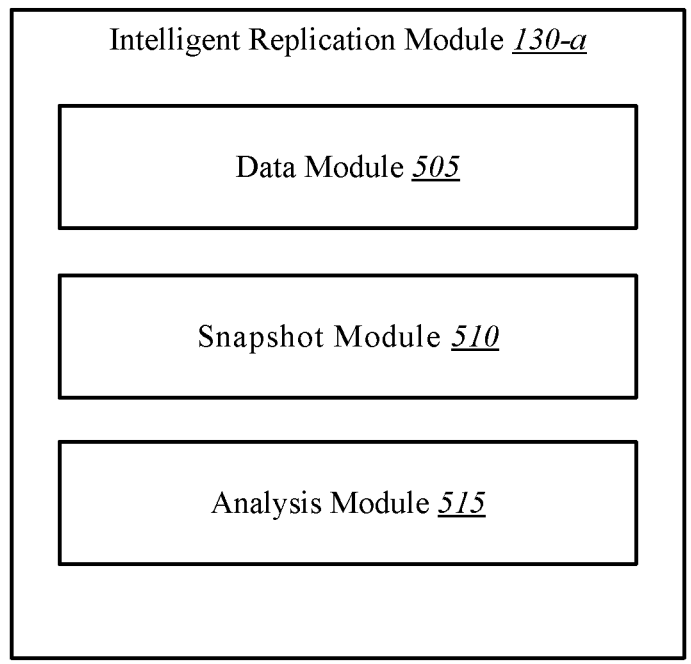
FIG. 5 is a block diagram illustrating one example of a replication module.

FIG. 5 is a block diagram illustrating one example of an intelligent replication module 130-a. Intelligent replication module 130-a may be one example of intelligent replication module 130 depicted in FIGS. 1 and/or 2. As depicted, intelligent replication module 130-a may include data module 505, snapshot module 510, and analysis module 515. In one embodiment, at least one aspect of intelligent replication module 130-a may include software and/or hardware elements of a network data storage system. For example, the intelligent replication module 130-a may be part of a cloud storage application configured to store data in a secured data environment.

In one embodiment, intelligent replication module 130 may be configured to replicate a snapshot hierarchy of a first storage system to a second storage system, such as replicating a snapshot hierarchy of storage system 105 to storage system 115 of FIGS. 1-4, for example. In one embodiment, data module 505 may replicate a first storage volume of a first storage system and a first user snapshot of the first storage volume to a second storage volume of a second storage system. An example of the first and second storage volumes may include, respectively, storage volume 120 and storage volume copy 125 of FIGS. 1-4.

An example of the first user snapshot may include first user first snapshot 135 of FIGS. 1-4. In some cases, the first user snapshot may include a point in time capture of data on the first storage volume at a first time. In some embodiments, snapshot module 510 may capture a first tree structure block (TSB) of the first storage system. One example of the first TSB may include tree structure block 170 and/or tree structure block 176 of FIGS. 2 and 4. In some configurations, the first TSB captures a hierarchy of each volume and/or snapshot of the first storage system. For example, the first TSB may capture when each snapshot is created, a timestamp of when each snapshot is created, a timestamp of when a snapshot is updated or modified, an order of when each snapshot is created, a parent-child relationship among a first snapshot and one or more subsequent snapshots of previous snapshots, and so forth. For example, a first snapshot may be created at a first time. At a second time, a second snapshot may be created that includes the first snapshot (e.g., a snapshot of a previous snapshot). At a third time, a third snapshot may be created that includes at least one of the first snapshot and the second snapshot, and so forth, the second snapshot being a child of the parent first snapshot, and the third snapshot being a child to the parent second snapshot and/or first snapshot.

In one embodiment, snapshot module 510 may create first and second system snapshots of the first TSB (e.g., system snapshots S1 172 and S2 174 of FIGS. 2 and 4). In some configurations, user snapshots are snapshots initiated by a user of a storage system while system snapshots are snapshots initiated by the storage system. Thus, in one embodiment, the first storage system, in conjunction with snapshot module 510, may initiate the creation of the first and second system snapshots of the first TSB.

In some embodiments, data module 505 may copy the first TSB into at least one of first and second system snapshots of the first TSB. If the first and second system snapshots of the first TSB are newly created, then data module 505 may copy content from the first TSB into both the first and second system snapshots of the first TSB. If a second TSB is captured by the snapshot module 510, In some cases, capturing a second TSB may be equivalent to updating the first TSB with a new capture of the current snapshot tree hierarchy subsequent to capturing a previous state of the snapshot tree hierarchy in the first TSB. Upon updating the first TSB, the current contents of the first system snapshot of the first TSB, containing the content of the first TSB before it is updated, may be copied to the second system snapshot of the first TSB, and after this, the content of the updated first TSB may be copied to the first system snapshot of the first TSB. Alternatively, capturing a second TSB may include capturing a separate TSB from the first TSB, in which case first and second system snapshots may be created for the second TSB that is separate from the first TSB.

In one embodiment, snapshot module 510 may create a second user snapshot of the first storage volume. In some cases, the second user snapshot may include a point in time capture of data on both the first storage volume and the first user snapshot at a second time, the second time being after the first time when the first user snapshot was captured.

In some embodiments, snapshot module 510 may capture a second TSB of the first storage volume after creating the second user snapshot. In some embodiments, snapshot module 510 may create first and second system snapshots of the second user snapshot. In some cases, data module 505 may copy a first system snapshot of the first user snapshot to at least one of the first and second system snapshots of the second user snapshot. Additionally, or alternatively, snapshot module 510 may capture a current hierarchy of each volume and/or snapshot of the first storage volume after creating the second user snapshot and update the first TSB with the captured current hierarchy of each volume and/or snapshot of the first storage volume.

In some embodiments, after capturing the second TSB, snapshot module 510 may capture a point in time snapshot of each snapshot and/or volume of the first storage system and determine whether the snapshot or volume has been modified since the last replication sync job. Modified data may include new data added to a volume or snapshot, data already existing at the last replication that is modified since the last replication, and data deleted since the last replication. In some embodiments, data module 505 may send only the data that has changed since the last replication to the second storage system.

For example, snapshot module 510 may capture a point in time snapshot of the first user snapshot. In some configurations, data module 505 may update the first system snapshot of the first user snapshot with the point in time snapshot of the first user snapshot. In some embodiments, analysis module 515 may compare the updated first system snapshot of the first user snapshot to the second system snapshot of the first user snapshot. Based on this comparison, analysis module 515 may identify a difference in data between the first and second system snapshots of the first user snapshot. In some cases, analysis module 515 may determine whether a difference exists based on the comparison. Upon identifying the difference in data, in some embodiments, data module 505 may update a replica of the first system snapshot of the first user snapshot on the second storage system based on the identified difference. For example, data module 505 may send only the identified difference in data to the second storage instead of sending the entire updated first user snapshot or the entire first system snapshot of the first user snapshot to the second storage system.

In one embodiment, upon capturing the hierarchy of each volume and/or snapshot of the first storage system in the second TSB, analysis module 515 may compare the first TSB to the second TSB. Based on comparing the first TSB to the second TSB, analysis module 515 may identify the second user snapshot as a new user snapshot added to the first storage system since capturing the first TSB. In some configurations, data module 505 may mount the second user snapshot as a volume viewable to a user of the first storage system.

Additionally, or alternatively, in some embodiments, data module 505 may copy contents of the first TSB to the first system snapshot of the first TSB. Data module 505 may then update the first TSB with a current hierarchy of each volume and/or snapshot of the first storage system. Data module 505 may copy the updated first system snapshot of the first TSB to the second system snapshot of the first TSB, and then copy the content of the updated first TSB to the first system snapshot of the first TSB. In some cases, analysis module 515 may then compare the first system snapshot of the first TSB to the second system snapshot of the first TSB to identify any difference in data. Upon identifying a difference in the data, via analysis module 515, data module 505 may copy only the changed data to a first system snapshot of a copy of the first TSB on the second storage volume.

In some embodiments, data module 505 may replicate, to the second storage system, the second user snapshot and the first and second system snapshots of the second user snapshot. Upon identifying the second user snapshot as a new user snapshot, data module 505 may copy the entirety of the contents of the second user snapshot to the second storage system. The data copied may come from the second user snapshot and/or one or both of the first and second system snapshots of the second user snapshot.

In some embodiments, data module 505 may receive a command to delete the first user snapshot of the first storage volume. In some cases, a user of the first storage system initiates the command to delete the first user snapshot. In some cases, intelligent replication module 130 initiates the command to delete the first user snapshot. For instance, in some cases, intelligent replication module 130 may initiate the command to delete the first user snapshot based on detecting a predetermined criteria being met, such as the first user snapshot failing to be accessed for at least a predetermined period of time, and the like.

In some cases, snapshot module 510 may capture a third TSB of the first storage volume after capturing the second TSB. As described above, capturing a new TSB may include updating a previously captured TSB, such as updating the first and/or second TSB, as described above. In some configurations, analysis module 515 may compare the third TSB to the second TSB to identify any changes to the data in each TSB.

In some embodiments, analysis module 515 may identify the command to delete the first user snapshot based on comparing the second TSB to the third TSB. For example, analysis module 515 may detect that the first user snapshot is no longer present on the first storage system by detecting that the first user snapshot is no longer found in the hierarchy of snapshots. Alternatively, analysis module 515 may detect that the first user snapshot is marked for deletion as a result of the command. In some embodiments, data module 505 may delete the first user snapshot of the first storage volume, if still present on the first storage system, as well as delete the first and second system snapshots of the first user snapshot in accordance with the command to delete the first user snapshot.

In some cases, data module 505 may send to the second storage system only changed data identified from comparing the third TSB to the second TSB. The changed data may include the deletion of the first user snapshot on the first storage system. Accordingly, in some cases, data module 505 may delete a replicated copy of the first user snapshot on the second storage system as well as delete the first and second system snapshots of the replicated copy of the first user snapshot on the second storage system in accordance with the command to delete the first user snapshot on the first storage system.

In some embodiments, a new user snapshot may be added to the second storage system. In some cases, analysis module 515 may identify the new user snapshot on the second storage volume based on data module 505 copying a replica of the third TSB to the second storage system and/or data module copying to the second storage system changed data identified from comparing the third TSB to the second TSB. Based on the data copied to the second storage system, data module 505 may identify the new user snapshot on the second storage volume.

For example, a replicated copy of the second TSB copied to the second storage volume may be compared to the data relative to the third TSB copied to the second storage system to identify a new user snapshot was added to the second storage volume since the last replication. Upon identifying the new user snapshot, data module 505 may create a hidden volume on the second storage volume. In some embodiments, data module 505 may mount the new user snapshot of the second storage volume on the created hidden volume. In some cases, snapshot module 510 may create first and second system snapshots of the hidden volume. In some embodiments, data module 505 may copy the hidden volume to at least one of the first and second system snapshots of the hidden volume.

Figure 6:
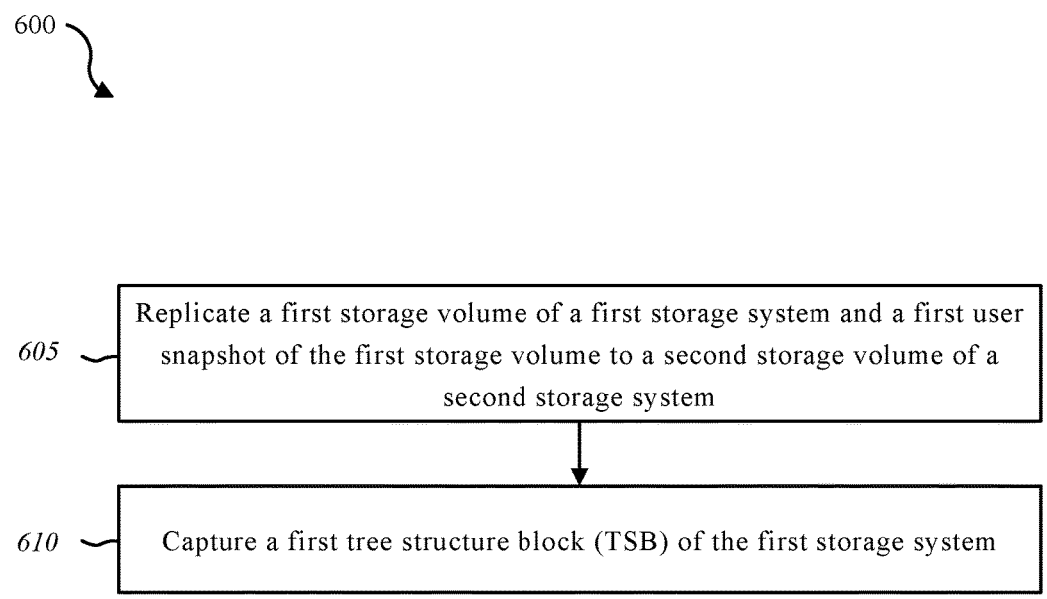
FIG. 6 is a flow diagram illustrating one embodiment of a method for intelligent replication of a snapshot tree.

FIG. 6 is a flow diagram illustrating one embodiment of a method 600 for intelligent replication of a snapshot tree. In some configurations, the method 600 may be implemented by the intelligent replication module 130 illustrated in FIGS. 1, 2, and/or 3. In some configurations, the method 600 may be implemented in conjunction with an application and/or a user interface of storage system 105/115 in FIG. 1.

At block 605, the method 600 may include replicating a first storage volume of a first storage system and a first user snapshot of the first storage volume to a second storage volume of a second storage system. In some cases, the first user snap-shot may include a point in time capture of data on the first storage volume at a first time. At block 610, the method 600 may include capturing a first tree structure block (TSB) of the first storage system. In some cases, the first TSB may capture a hierarchy of each snapshot and/or volume of the first storage system.

Figure 7:
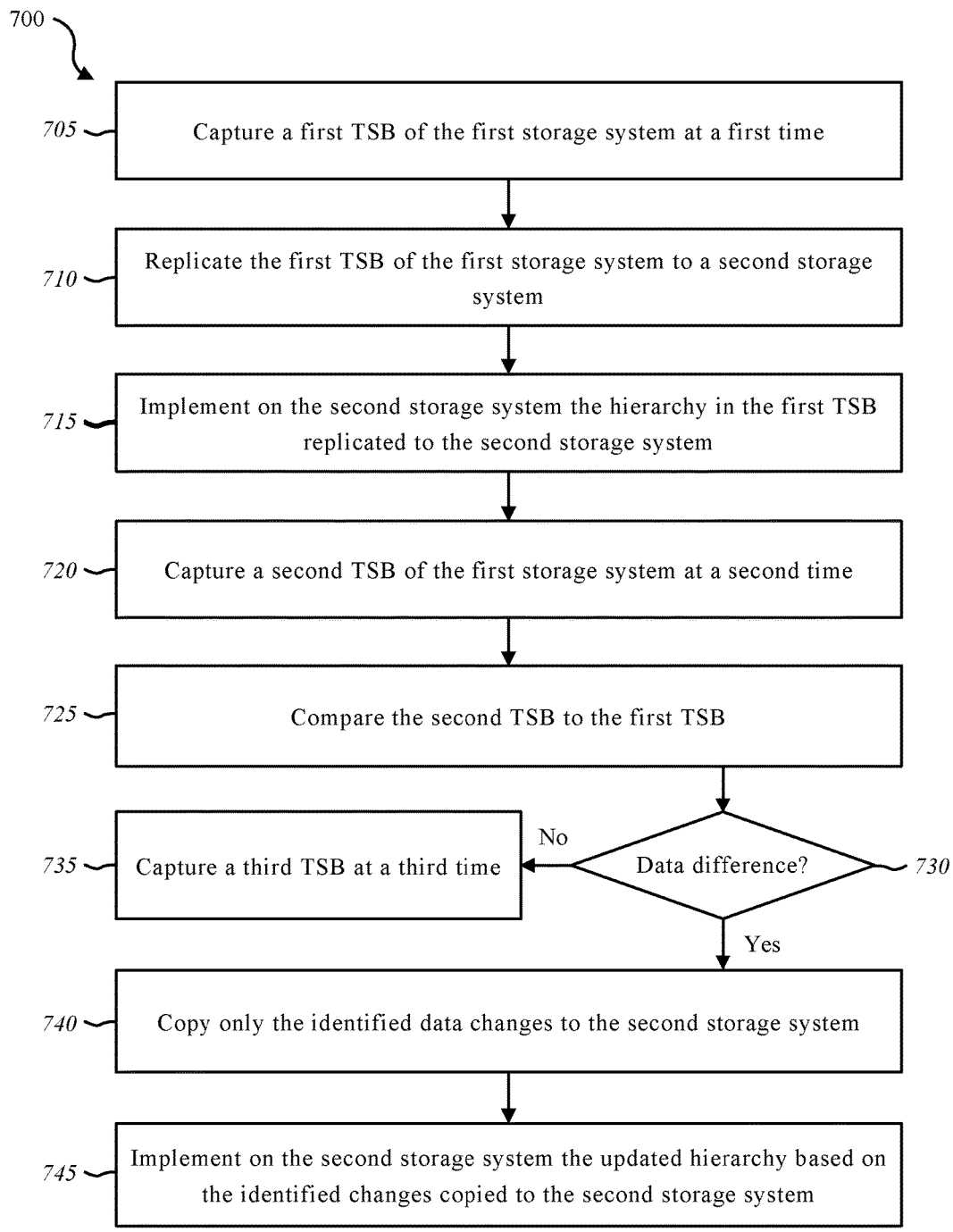
FIG. 7 is a flow diagram illustrating another embodiment of a method for intelligent replication of a snapshot tree.

FIG. 7 is a flow diagram illustrating another embodiment of a method 700 for intelligent replication of a snapshot tree. In some configurations, the method 700 may be implemented by the intelligent replication module 130 illustrated in FIGS. 1, 2, and/or 3. In some configurations, the method 700 may be implemented in conjunction with an application and/or a user interface of storage system 105/115 in FIG. 1.

At block 705, the method 700 may include capturing a first TSB of the first storage system at a first time. In some cases, the first storage system may include at least a first storage volume and a first user snapshot. Thus, the first TSB may include a captured hierarchy of each snapshot and/or volume of the first storage system at the first time. At block 710, the method 700 may include replicating the first TSB of the first storage system to a second storage system.

At block 715, the method 700 may include implementing on the second storage system the hierarchy of each snapshot and/or volume of the first storage system contained in the first TSB that is replicated to the second storage system. At block 720, the method 700 may include capturing a second TSB of the first storage system at a second time after the first time.

At block 725, the method 700 may include comparing the second TSB to the first TSB. At block 730, the method 700 may include determining whether a difference in data exists based on comparing the second TSB to the first TSB. At block 735, upon determining no change exists, indicating the hierarchy has not changed since capturing the first TSB, the method 700 may include capturing a third TSB at a third time. In some embodiments, the method 700 may include comparing the third TSB to the first and/or second TSB to determine whether a change in the hierarchy has occurred since the second time.

At block 740, upon determining a change between the first and second TSBs does exist, indicating the hierarchy has changed since capturing the first TSB at the first time, the method 700 may include copying to the second storage system only those identified changes in the hierarchy identified from the comparing. At block 745, the method 700 may include implementing on the second storage system the updated hierarchy of each snapshot and/or volume of the first storage system based on the identified changes copied to the second storage system.

Figure 8:
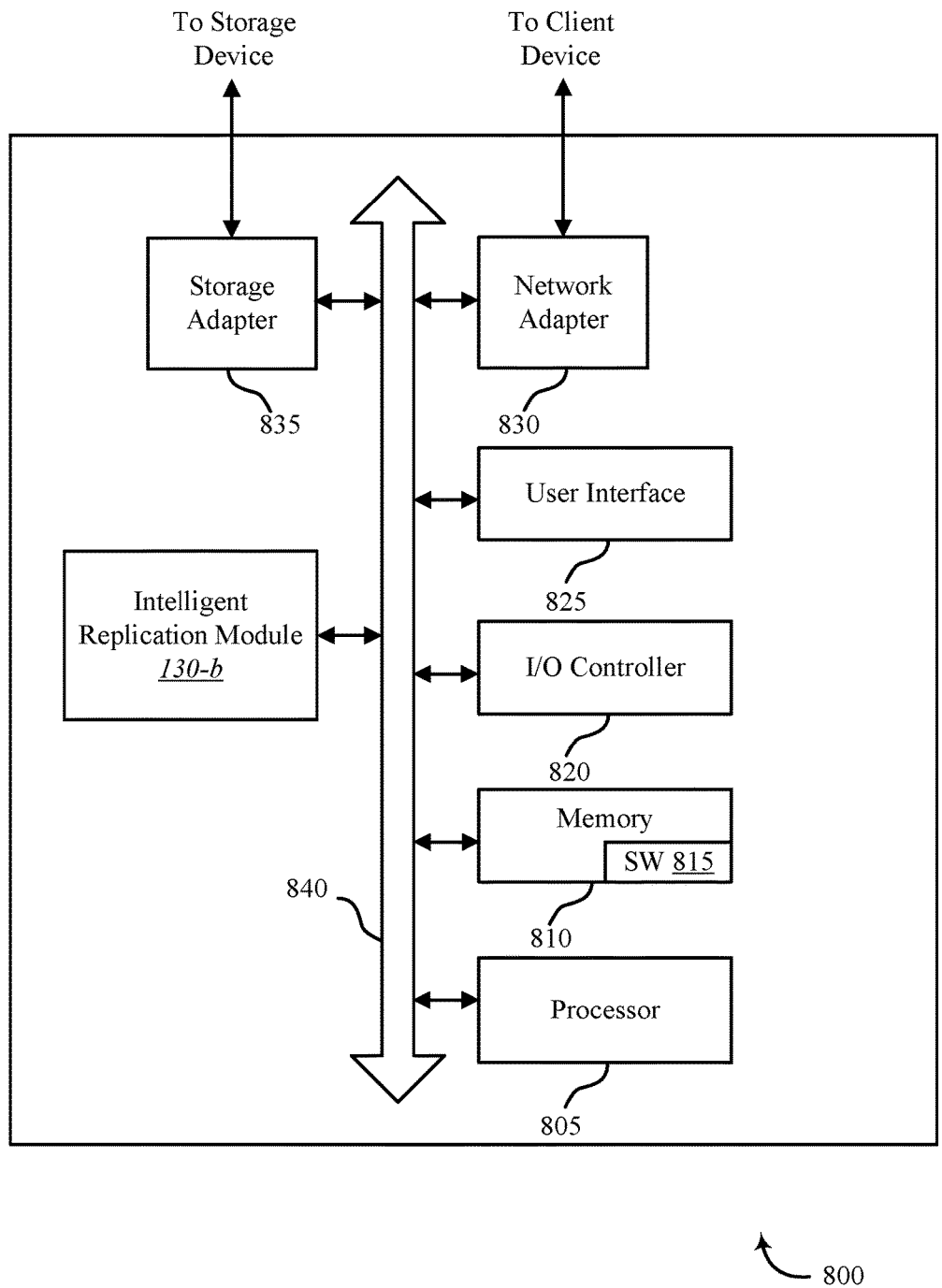
FIG. 8 depicts a block diagram of a computer system suitable for implementing the present systems and methods.

FIG. 8 shows a system 800 for intelligent replication of a snapshot tree, in accordance with various examples. System 800 may illustrate an apparatus, which may be an example of any one of device or storage system 105 and/or 115 of FIG. 1. System 800 may include components for bi-directional voice and data communications including components for transmitting communications and components for receiving communications. For example, system 800 may communicate bi-directionally with one or more storage devices and/or client systems. This bi-directional communication may be direct (e.g., system 800 communicating directly with a storage system) and/or indirect (e.g., system 800 communicating indirectly with a client device through a server).

System 800 may include a processor module 805, and memory 810 (including software/firmware code (SW) 815), an input/output controller module 820, a user interface module 825, a network adapter 830, and a storage adapter 835. The software/firmware code 815 may be one example of a software application executing on system 800. The network adapter 830 may communicate bi-directionally, via one or more wired links and/or wireless links, with one or more networks and/or client devices. In some embodiments, network adapter 830 may provide a direct connection to a client device via a direct network link to the Internet via a POP (point of presence). In some embodiments, network adapter 830 of system 800 may provide a connection using wireless techniques, including digital cellular telephone connection, Cellular Digital Packet Data (CDPD) connection, digital satellite data connection, and/or another connection. The system 800 may include an intelligent replication module 130-b, which may perform the functions described above for the intelligent replication module 130 of FIGS. 1 and/or 2.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 830 may enable one or more of WWAN (GSM, CDMA, and WCDMA), WLAN (including Wi-Fi), WMAN (WiMAX) for mobile communications, antennas for Wireless Personal Area Network (WPAN) applications (including RFID and UWB), etc.

One or more buses 840 may allow data communication between one or more elements of system 800 (e.g., processor module 805, memory 810, I/O controller module 820, user interface module 825, network adapter 830, and storage adapter 835, etc.).

The memory 810 may include random access memory (RAM), read only memory (ROM), flash RAM, and/or other types. The memory 810 may store computer-readable, computer-executable software/firmware code 815 including instructions that, when executed, cause the processor module 805 to perform various functions described in this disclosure. Alternatively, the software/firmware code 815 may not be directly executable by the processor module 805 but may cause a computer (e.g., when compiled and executed) to perform functions described herein. Alternatively, the computer-readable, computer-executable software/firmware code 815 may not be directly executable by the processor module 805, but may be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

In some embodiments, the memory 810 may contain, among other things, the Basic Input-Output system (BIOS) which may control basic hardware and/or software operation such as the interaction with peripheral components or devices. For example, the intelligent replication module 130-b to implement the present systems and methods may be stored within the system memory 810. Applications resident with system 800 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 830, etc.).

Many other devices and/or subsystems may be connected to one or may be included as one or more elements of system 800 (e.g., personal computing device, mobile computing device, smart phone, server, internet-connected device, cell radio module, and so on). In some embodiments, all of the elements shown in FIG. 8 need not be present to practice the present systems and methods. The devices and subsystems can be interconnected in different ways from that shown in FIG. 8. In some embodiments, an aspect of some operation of a system, such as that shown in FIG. 8, may be readily known in the art and are not discussed in detail in this application. Code to implement the present disclosure can be stored in a non-transitory computer-readable medium such as one or more of system memory 810 or other memory. The operating system provided on I/O controller module 820 may be a mobile device operating system, desktop operating system, or another known operating system.

The I/O controller module 820 may operate in conjunction with network adapter 830 and/or storage adapter 835. The network adapter 830 may enable system 800 with the ability to communicate with client devices (e.g., storage system 105/115 of FIG. 1), and/or other devices over the network 110 of FIG. 1. Network adapter 830 may provide wired and/or wireless network connections. In some cases, network adapter 830 may include an Ethernet adapter or Fibre Channel adapter. Storage adapter 835 may enable system 800 to access one or more data storage devices. The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 9:
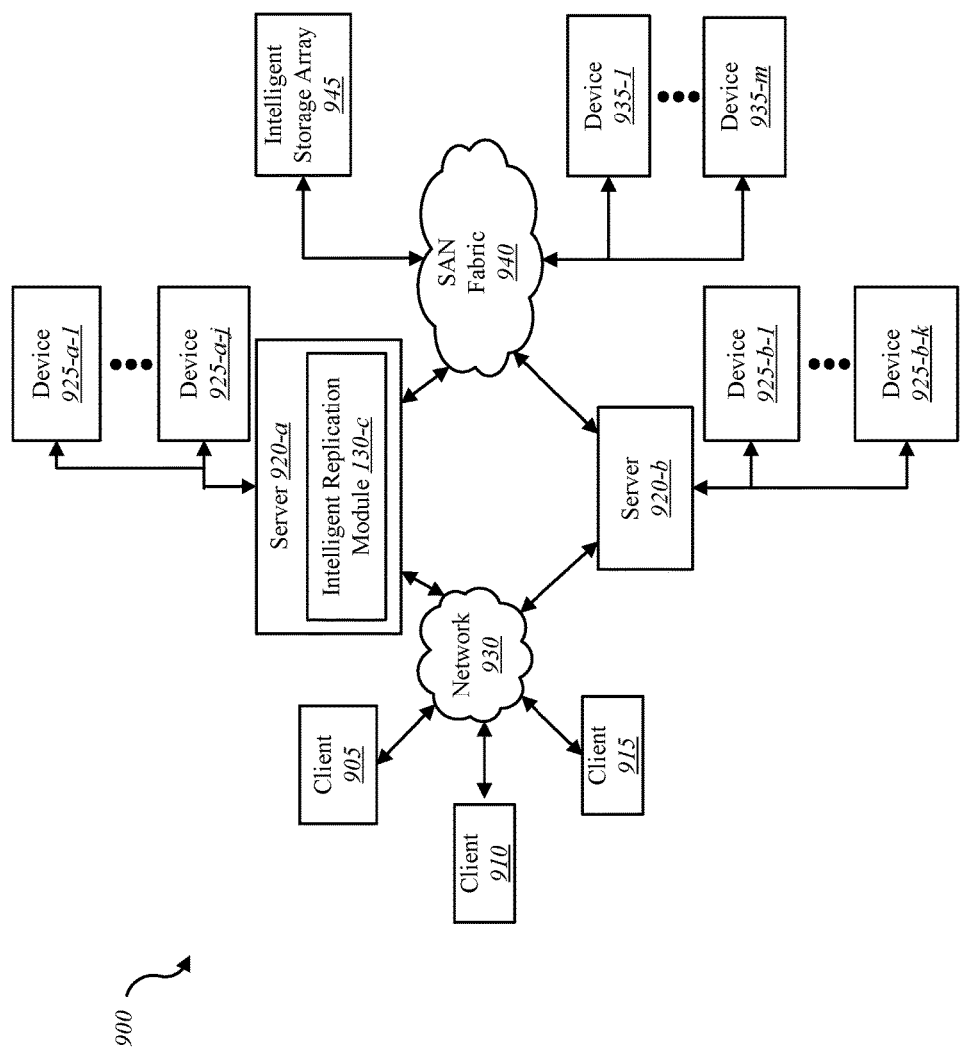
FIG. 9 is a block diagram depicting a network architecture for client systems, as well as storage servers (any of which can be implemented using the computer system).

FIG. 9 is a block diagram depicting a network architecture 900 in which client systems 905, 910 and 915, as well as storage servers 920-a and 920-b (any of which can be implemented using network architecture 900), are coupled to a network 930. In one embodiment, intelligent replication module 130-c may be located within one of the storage servers 920-a, 920-b to implement the present systems and methods. Intelligent replication module 130-c may be one example of intelligent replication module 130 depicted in FIGS. 1, 2, 3, 4, 5, and/or 8. The storage server 920-a is further depicted as having storage devices 925-a-1 through 925-a-j directly attached, and storage server 920-b is depicted with storage devices 925-b-1 through 925-b-k directly attached. SAN fabric 940 supports access to storage devices 935-1 through 935-m by storage servers 920-a and 920-b, and so by client systems 905, 910 and 915 via network 930. Intelligent storage array 945 is also shown as an example of a specific storage device accessible via SAN fabric 940.

With reference to system 800, network adapter 830 or some other method may be used to provide connectivity from each of client systems 905, 910 and 915 to network 930. Client systems 905, 910 and 915 are able to access information on storage server 920-a or 920-b using, for example, a web browser or other client software (not shown). Such a client allows client systems 905, 910 and 915 to access data hosted by storage server 920-a or 920-b or one of storage devices 925-a-1 to 925-a-j, 925-b-1 to 925-b-k, 935-1 to 935-m, or intelligent storage array 945. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A storage system, comprising:
   a storage controller operable to:
   replicate a first storage volume of a first storage system and a first user snapshot of the first storage volume to a second storage volume of a second storage system, the first user snapshot comprising a point in time capture of data on the first storage volume at a first time; and
   capture a first tree structure block (TSB) of the first storage system, wherein the first TSB captures a hierarchy of snapshots and volumes of the first storage system, the hierarchy comprising a map of interconnections of the volumes and the snapshots of the first storage system;
   create first and second system snapshots of the first TSB, wherein user snapshots are initiated by a user of the storage system and system snapshots are initiated by the storage system; and
   copy the first TSB into at least one of first and second system snapshots of the first TSB.

2. The storage system of claim 1, wherein the storage controller is further operable to:

create a second user snapshot of the first storage volume, wherein the second user snapshot comprises a point in time capture of data on both the first storage volume and the first user snapshot at a second time, the second time being after the first time.

3. The storage system of claim 2, wherein the storage controller is further operable to:
capture a second TSB of the first storage system after creating the second user snapshot.

4. The storage system of claim 3, wherein the storage controller is further operable to:
create first and second system snapshots of the second user snapshot; and
copy a first system snapshot of the first user snapshot to at least one of the first and second system snapshots of the second user snapshot.

5. The storage system of claim 4, wherein the storage controller is further operable to:
after capturing the second TSB, capture a point in time snapshot of the first user snapshot.

6. The storage system of claim 5, wherein the storage controller is further operable to:
update the first system snapshot of the first user snapshot with the point in time snapshot of the first user snapshot; and
compare the updated first system snapshot of the first user snapshot to the second system snapshot of the first user snapshot.

7. The storage system of claim 6, wherein the storage controller is further operable to:
identify, based on the comparing, a difference in data between the first and second system snapshots of the first user snapshot; and
update a replica of the first system snapshot of the first user snapshot on the second storage volume based on the identified difference.

8. The storage system of claim 5, wherein the storage controller is further operable to:
compare the first TSB to the second TSB;
based on comparing the first TSB to the second TSB, identify the second user snapshot as a new user snapshot since capturing the first TSB; and
mount the second user snapshot as a volume viewable to a user of the first storage system.

9. The storage system of claim 8, wherein the storage controller is further operable to:
replicate, to the second storage system, the second user snapshot and the first and second system snapshots of the second user snapshot.

10. The storage system of claim 3, wherein the storage controller is further operable to:
receive a command to delete the first user snapshot of the first storage volume; and
capture a third TSB of the first storage system after capturing the second TSB.

11. The storage system of claim 10, wherein the storage controller is further operable to:
identify the command to delete the first user snapshot based on comparing the second TSB to the third TSB; and
delete the first user snapshot of the first storage volume and the first and second system snapshots of the first user snapshot based on identifying the command to delete the first user snapshot.

12. The storage system of claim 11, wherein the storage controller is further operable to:
identify a new user snapshot on the second storage volume based on a replica of the third TSB copied to the second storage system; and
create a hidden volume on the second storage volume.

13. The storage system of claim 12, wherein the storage controller is further operable to:
mount the new user snapshot of the second storage volume on the hidden volume;
create first and second system snapshots of the hidden volume; and
copy the hidden volume to at least one of the first and second system snapshots of the hidden volume.

14. An apparatus comprising:
a storage drive configured for incorporation into a data center or private cloud environment; and
a controller operable to:
replicate a first storage volume of a first storage system and a first user snapshot of the first storage volume to a second storage volume of a second storage system, the first user snapshot comprising a point in time capture of data on the first storage volume at a first time;
capture a first tree structure block (TSB) of the first storage system, wherein the first TSB captures a hierarchy of snapshots and volumes of the first storage system, the hierarchy comprising a map of interconnections of the volumes and the snapshots of the first storage;
create first and second system snapshots of the first TSB, wherein user snapshots are initiated by a user of the storage system and system snapshots are initiated by the storage system; and
copy the first TSB into at least one of first and second system snaps hots of the first TSB.

15. The apparatus of claim 14, wherein the controller is operable to:
create a second user snapshot of the first storage volume, wherein the second user snapshot comprises a point in time capture of data on both the first storage volume and the first user snapshot at a second time, the second time being after the first time.

16. The apparatus of claim 15, wherein the controller is operable to:
capture a second TSB of the first storage system after creating the second user snapshot;
create first and second system snapshots of the second user snapshot; and
copy a first system snapshot of the first user snapshot to at least one of the first and second system snapshots of the second user snapshot.

17. A method for operating a storage device, the method comprising:
replicating a first storage volume of a first storage system and a first user snapshot of the first storage volume to a second storage volume of a second storage system, the first user snapshot comprising a point in time capture of data on the first storage volume at a first time; and
capturing a first tree structure block (TSB) of the first storage system, wherein the first TSB captures a hierarchy of snapshots and volumes of the first storage system, the hierarchy comprising a map of interconnections of the volumes and the snapshots of the first storage system;

creating first and second system snapshots of the first TSB, wherein user snapshots are initiated by a user of the storage system and system snapshots are initiated by the storage system; and copying the first TSB into at least one of first and second system snapshots of the first TSB.

\* \* \* \* \*